United States Patent
Havela et al.

(10) Patent No.: US 7,444,265 B2
(45) Date of Patent: Oct. 28, 2008

(54) MACHINE AND/OR MONITORING

(75) Inventors: Tuija Havela, Sundsvall (SE); Mikael Lundberg, Sundsvall (SE); Anders Persson, Sundsbruk (SE); Krystof Kryniski, Lindingo (SE)

(73) Assignee: Metso Paper, Inc. (FI)

( * ) Notice: Subject to any disclaimer, the term of this patent is extended or adjusted under 35 U.S.C. 154(b) by 0 days.

(21) Appl. No.: 10/558,967

(22) PCT Filed: Jun. 7, 2004

(86) PCT No.: PCT/SE2004/000866

§ 371 (c)(1),
(2), (4) Date: Oct. 31, 2006

(87) PCT Pub. No.: WO2004/109250

PCT Pub. Date: Dec. 16, 2004

(65) Prior Publication Data

US 2007/0198219 A1 Aug. 23, 2007

(30) Foreign Application Priority Data

Jun. 5, 2003 (SE) .................................. 0301635

(51) Int. Cl.
*G06F 11/30* (2006.01)
*G06F 17/40* (2006.01)
(52) U.S. Cl. ...................... 702/183; 702/187
(58) Field of Classification Search .................. 702/56, 702/105, 141, 180, 183, 188, 190
See application file for complete search history.

(56) References Cited

U.S. PATENT DOCUMENTS 5,109,700 A    5/1992   Hicho
5,602,757 A *  2/1997   Haseley et al. ............. 702/56
6,484,109 B1 * 11/2002   Lofall ........................ 702/56
2002/0139191 A1 10/2002  Hedeen et al.

FOREIGN PATENT DOCUMENTS

| EP | 1 227 023 A2 | 7/2002 |
| EP | 1 312 815 A1 | 5/2003 |
| WO | WO 96/13011 A1 | 5/1996 |
| WO | WO 01/23861 A1 | 4/2001 |

* cited by examiner

*Primary Examiner*—Bryan Bui
(74) *Attorney, Agent, or Firm*—Lerner, David, Littenberg, Krumholz & Mentlik, LLP

(57) ABSTRACT

In a method of monitoring the status of a machine and/or a process run on the machine a plurality of parameters (v) containing information about the status of the machine and/or the process is measured and stored. From a database (24) a corresponding plurality of stored reference values for the parameters are extracted according to a predetermined criteria, and the plurality of measured parameters are compared with the plurality of corresponding reference values for determining the status of the machine and/or the process. A corresponding system for automatic on-line monitoring includes at least one sensor for sensing a plurality of parameters (v) containing information about the status of the machine and/or of a process run on the machine. Extracting unit (22) are provided for extracting from a database (24) a corresponding plurality of stored reference values for said parameters according to predetermined criteria. A comparator compares the plurality of measured parameters with the plurality of corresponding reference values for determining the status of machine and/or process.

60 Claims, 9 Drawing Sheets

MACHINE AND/OR MONITORING

CROSS-REFERENCE TO RELATED APPLICATIONS

This application claims priority from Sweden Application No. 0301635-9, filed Jun. 5, 2003.

FIELD OF INVENTION

The present invention relates to a method of monitoring the status of a machine and/or a process run on the machine, and to a system for such automatic on-line monitoring.

BACKGROUND OF THE INVENTION

It is desirable to be able to detect the status of a machine and/or a process run on the machine e.g. mechanical conditions and defects in moving parts of a machine, e.g. bearings of a rotating machine, especially for large and heavy machines like refiners used for the treatment of fiber material in connection with the manufacture of paper or board, in order to avoid emergency stops in the production. An early detection of the developing of defects also allows better planning of maintenance and cost effective service on the machine. Unnecessary stops in the production are avoided thus maximizing the production.

WO 9613011 a technique is described for determining different "footprints" for vibration data of a machine before the machine is taken into actual operation. These footprints are determined for different operation conditions of the machine. In later operation of the machine vibrations are monitored by comparison of sensed vibration data with footprints stored for the operation condition in question of the machine.

SUMMARY OF THE INVENTION

The purpose of the present invention is to propose an improved method and provide an improved system for monitoring the status of a machine and/or a process run on the machine such that the above mentioned goals are reached.

With the present invention a total solution for a monitoring concept for a machine in operation. The concept can be divided into the following monitoring objects. All these parts can be considered as practical examples and therefore exact values of all measured parameters are important for the monitoring concept.

1. The condition of bearings can be determined by this technique. Also statistic tools like multiVariat data analysis can be coupled to the analysis.
2. The hydraulic panel: Measurement of the oil flow for lubrificating oil is of utmost importance for the machine condition. Therefore a signal representing the oil flow to all bearings can be coupled to the system for the monitoring purpose.
3. Monitoring the quality of the oil: A measured value for the number of foreign particles in the oil and the position of water in the oil can be related to the analysis for the monitoring.
4. Feed guards for the control system of the machine are monitored and can then be used for the solution of operation problems. Exact values of all measured signals/parameters can be related to each other according to the invention in a system reference module.
5. Further, with the invention monitoring of the machine is associated with optimization of processes run on the machine. Exact values for all measured parameters can still be related to each other in a system reference module.

Thus statistic analysis, e.g. MultiVariate Analysis, can thus be used for correlating a vibrations signal and different key parameters with each other. In this way differing states of machine and process can be detected. A normal state cannot be fully defined by defining certain operation conditions, since the process can be very complex. Exact values of machine status and process are needed to be able to obtain complete stability of the machine and the process. By on-line monitoring according to the invention the availability in the production can be considerably increased via increased stability.

According to an advantageous embodiment of the invention said plurality of parameters contains information about mechanical conditions of a moving part of the machine. Vibrations or accelerations measured on moving parts of a machine, like bearings of a rotating machine, are depending not only on the mechanical status of the moving part in question but also on the loading of the machine. A plurality of parameters containing information about the mechanical condition of the moving part is therefore measured and compared with a stored plurality of reference values for the measured parameters, extracted according to predetermined criteria. By using a plurality of parameters in this way data are analyzed from different angles of view and a more comprehensive and sensitive monitoring is created and obtained results are more stable and reliable. In a conventional monitoring system warnings and alarms are triggered when monitored parameters exceed pre-defined threshold levels. Such an approach functions well only when a limited number of parameters are watched. However, in a multi-parameter approach according to the present invention a significant number of parameters is watched and setting up individual thresholds for each parameter would be very time-consuming. Therefore an automatic technique is proposed wherein a plurality of references are generated over a predetermined time period and specified loading parameters. By using SQL-query a set of measurements is retrieved, which was measured at the requested time period and satisfies predefined loading conditions.

According to an advantageous embodiment of the method according to is the invention at least one quantity representing the loading of the machine is measured simultaneously with the measurement of the plurality of parameters, and stored reference values determined for the same loading of the machine as the loading represented by the measured quantity are extracted as the corresponding plurality of reference values. Thus the measured plurality of parameters is compared with a plurality of reference values obtained for the same loading of the machine. Since the loading conditions are the same, measured parameters can be directly compared to corresponding reference values and observed significant changes can be directly used for producing a warning signal.

According to still another advantageous embodiment of the method according to the invention the measured parameters are treated by statistic methods to verify the stability of the measured parameters before the comparison with corresponding reference values. The measured plurality of parameters are consequently processed statistically before the comparison with corresponding reference values. Thus quantities like average value, standard deviation, peak values etc. are derived and if the statistical stability of the measured parameters is good they are normalized and used for further analysis, e.g. trending analysis. The outcome of each post-processing function can be trending over the pre-defined time period at pre-defined loading conditions. The trending process measures the stability of the parameters used and reveals the changes occurring over time. Trending analysis can consequently be used for detecting machine faults and monitoring their progression.

According to another advantageous embodiment of the method according to the invention, wherein the plurality of reference values are formed by originally measured pluralities of parameters, measured pluralities of parameters are grouped according to loading conditions of the machine and cross-correlated with correspondingly grouped originally measured pluralities of parameters. Thus, to detect machine fault initiation and track its progression measured parameters are grouped according to loading conditions and cross-correlated with correspondingly grouped originally measured pluralities of parameters for trending analysis as indicated above.

According to yet another embodiment of the method according to the invention, wherein the moving part is a bearing of a rotating machine and the plurality of parameters includes vibrations in the bearing, and wherein the vibrations are sensed and a corresponding vibration signal is produced, the loading of the machine is determined by measuring at least one signal representing an operating condition of the machine and/or a parameter of a process run on the machine, said at least one signal being measured simultaneously with the vibration signal and stored together with vibration signal data, and vibration signal data related to the measured operating condition and/or process parameter according to predetermined criteria are selected for further processing for monitoring purpose, like setting an alarm triggering threshold level for the vibration signal, determining a frequency spectrum or a spectrogram, etc. The loading of the machine is consequently determined by measurement of an operating condition of the machine and/or a parameter of a process run on the machine. Such parameters could be electric motor powers, temperatures, hydraulic pressures, etc. By selecting vibration signal data related to simultaneously measured operating conditions and/or process parameter data according to predetermined criteria for further processing for monitoring purposes as described above, an incipient defect of a bearing can be reliably detected at an early stage. Thus an alarm can be automatically triggered when the vibration signal reaches a threshold level, or the vibration signal can visualized by e.g. a frequency spectrum or a spectrogram for facilitating the monitoring. By criteria based signal processing according to the present invention the most convenient processing is secured. By early detection of defects in the bearings other damages to the shaft unit of the machine are avoided as well. The monitoring is performed automatically and on-line. By on-line signal processing monitored parameters are continuously derived during the measurements. Further, with the technique according to the invention open architecture can be used which makes flexible solutions possible. Thus more custom tailored monitoring solutions can be obtained than with other existing monitoring system. The system according to the invention can also be easily modified to fit an application demanding a cheap monitoring system. The technique according to the invention can be used for monitoring slowly rotating machines as well, the sampling frequency for the measured vibration signal than being increased, from typically 40-50 kHz to typically 600 kHz.

According to another advantageous embodiment of the method according to the invention the frequency pattern for the bearing is determined by processing of the vibration signal. In this way a "bearing signature" which is specific for each machine is obtained.

According to other advantageous embodiments of the method according to the invention a plurality of vibration signals representing vibrations in several measuring points of a bearing or vibrations in several bearings are produced and stored together with said signal representing operating conditions of the machine and/or a parameter of the process run on the machine. The plurality of vibration signals can also be stored together with a plurality of signals representing several operating conditions of the machine and/or several parameters of the process run on the machine. Each vibration sensing point is allotted its own address. Systems allowing up to 8 acceleration signals with process parameters are available, however, a number of channels can easily be extended by introducing a current multiplexer.

According to an advantageous embodiment of the system according to the invention the sensor comprises an accelerometer, preferably a high-frequency accelerometer. The accelerometer is preferably permanently mounted at a predefined measurement point of the machine.

According to another advantageous embodiment of the system according to the invention a data acquisition unit, including an A/D-converter and a network of digital filters, is connected to said sensor for A/D-converting the sensed vibration signal and extracting information from it. In this way the measured vibration signal is utilized several times for optimizing the information extraction.

According to still another advantageous embodiment of the system according to the invention the filters comprise bandpass and envelope filters. Suitable bandwidths for envelope purposes are then obtained for optimizing the analyzing tools to detect characteristic frequencies whose amplitude modulation is to be monitored.

According to other advantageous embodiments of the system according to the invention the further signal processing means comprise a function unit, e.g. a MVA-trend analyzer, for correlating the selected vibration signal data with simultaneously measured operating condition and/or process parameter data for setting the alarm triggering threshold level for the vibration signal depending on the result of the correlation. If there is a high correlation between vibration signal data and for instance parameter data from the process run on the machine, the largest contribution to the sensed vibration signal is likely to emanate from the process, whereas if the correlation is low it is likely that most of the sensed vibration signal is caused by the bearing. Increased vibration levels due to e.g. process related events can be mixed with bearing and machine related events. With the present invention these two sources of vibrations can thus be separated and vibrations related to bearing and machine conditions can be detected.

According to yet another advantageous embodiment of the system according to the invention the further signal processing means comprise an FFT-analyzer to identify major frequency components.

According to other advantageous embodiments of the system according to the invention the further signal processing means comprise an envelope detector. Such detectors are available in very efficient real time implementations by digital signal processing technologies, and by forming the signal envelope the filtered signal is demodulated and transformed back to the base band frequency range. The signal processing means also preferably comprise an envelope enhancer to reinforce pulse signals.

According to another advantageous embodiment of the system according to the invention the signal processing means comprise a stroboscopic analyzer. With such an analyzer defects like cracks, spalls, etc. can be detected.

According to another advantageous embodiment of the system according to the invention the signal processing means are realized by function modules. The invention is based on an open architecture and each one of the modules is then capable of operating independently. Each module can be easily removed, replaced or modified to run on different platforms, e.g. a PC-based or DSP-based platform. Also new modules for acquiring or processing data can be easily introduced.

According to yet another advantageous embodiment of the system according to the invention the comparator means is adapted to compare the vibration signal to different warning and/or safety threshold levels, set depending on the result of the further signal processing, to trigger a warning or safety risk indicator. These threshold levels can be adapted to the digital signal processing configuration and adjusted in a calibration or re-calibration phase.

According to still other advantageous embodiments of the system according to the invention a client interface is provided for obtaining information from the monitoring via Web-browsers, and a system interface is provided for remote operation of the system. Thus in this way information from the monitoring can be made available to the users via Web-browsers, e.g. Internet Explorer or Netscape, for analysis at a remote location, e.g. at a service centre, where troubleshooting and reporting can be prepared for the customer. By the system interface hardware as well as software of the system can be remotely controlled. Measurements can be remotely scheduled, data processing remotely executed, and information and data remotely managed.

To further explain the invention embodiments of the system according to the invention, chosen as examples, will now described in greater detail with reference to the drawings.

DETAILED DESCRIPTION

Figure 1:
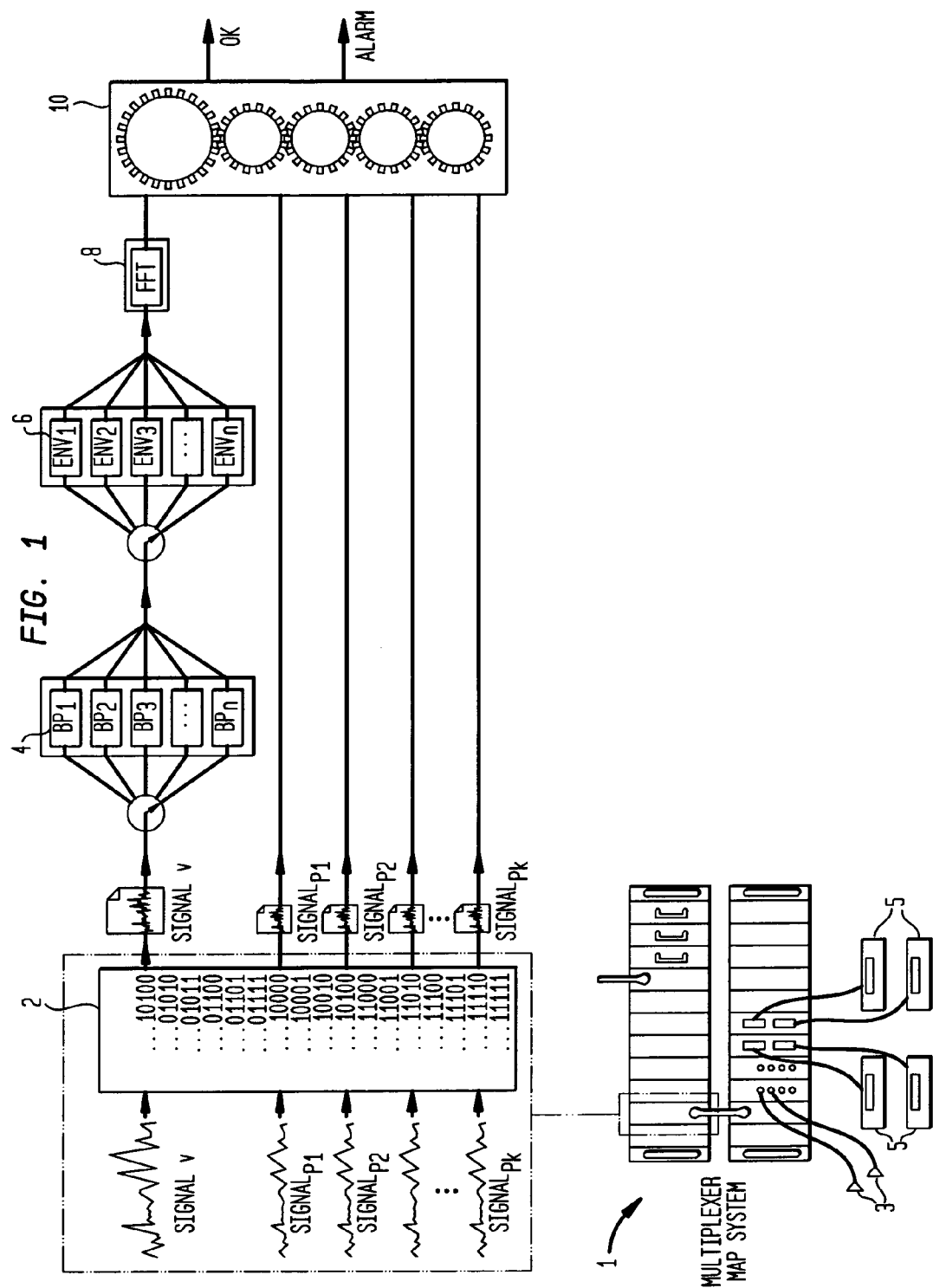
FIG. 1 illustrates a first embodiment of the system according to the invention.

FIG. 1 illustrates a first embodiment of the system according to the invention. By a data acquisition unit 1 the acceleration or vibration signal v is measured by using accelerometers permanently mounted at predefined measuring points on the bearings of the monitored machine. At the same time data about the operating condition of the machine and/or parameters of a process run on the machine in the form of process parameters $p_1, p_2 \ldots p_k$ are collected to determine the machine loading. Each measurement point and each monitored parameter, i.e. the vibration signal with a specific running condition or process parameter for the machine in question, have its own identity and configuration. These analogue signals v, $p_1, p_2 \ldots p_k$ are supplied to an A/D converter 2 for A/D conversion.

The data acquisition unit is PC-based and consists of a sensor conditioning box and a 16 bits/200 kHz data acquisition card. This embodiment is capable of handling eight ICP channels for vibration signals measured by bearings ICP sensors 3 and eight channels of AC or 4-20 mA signals for process parameters, schematically illustrated at 5 in the figure. In this way up to 8 acceleration signals together with the process parameters can be acquired. The number of channels can be easily extended by introducing a current multiplexer.

The sensor conditioning box of the data acquisition unit 1 contains e.g. ICP drivers, i.e. electronic circuits producing constant current excitation to drive the ICP sensors 3, cf. FIG. 1. The signal conditioning box also contains an anti-aliasing analogue filter with a cut-off frequency of 17 Hz, high pass filters to eliminate low frequency signals, programmable gaining means to amplify the analogue signals from 0 dB to 70 dB in steps of 10 dB, and a digital I/O controller for interfacing the data acquisition unit.

After A/D conversion the digital raw (unfiltered) signal v is utilized several times by using a network of digital filters. The network comprises band pass filters 4 and envelope filters 6, predefined in a digital signal processor control DSP-control (not shown in the figure). The filters can be IIR filters and an envelope enhancer can be provided to reinforce pulse signals. By this filtering as much information as possible is extracted from the vibration signal v.

The network of filters 4,6 is followed by a FFT unit 8; a FFT analyzer to identify major frequency components.

As an alternative, neural networks can preferably be included for the signal processing.

In a function unit 10 the processed vibration signal v is related to the machine operating conditions and/or the process parameters $p_1, p_2 \ldots p_k$. The function unit 10 can include different tools for correlation, like Multi Variate Data Analysis, trending etc. After a learning period for the configuration and the monitoring alarm triggering threshold values for the vibration signal is set depending on the result of the correlation.

Different other threshold levels can be set as warning and/or security threshold levels to trigger a warning indicator and/or indicator of a security risk. The threshold levels are related to each digital signal processing configuration, (and each one of such configurations has its identity so that the alarms can be tracked.

Figure 2:
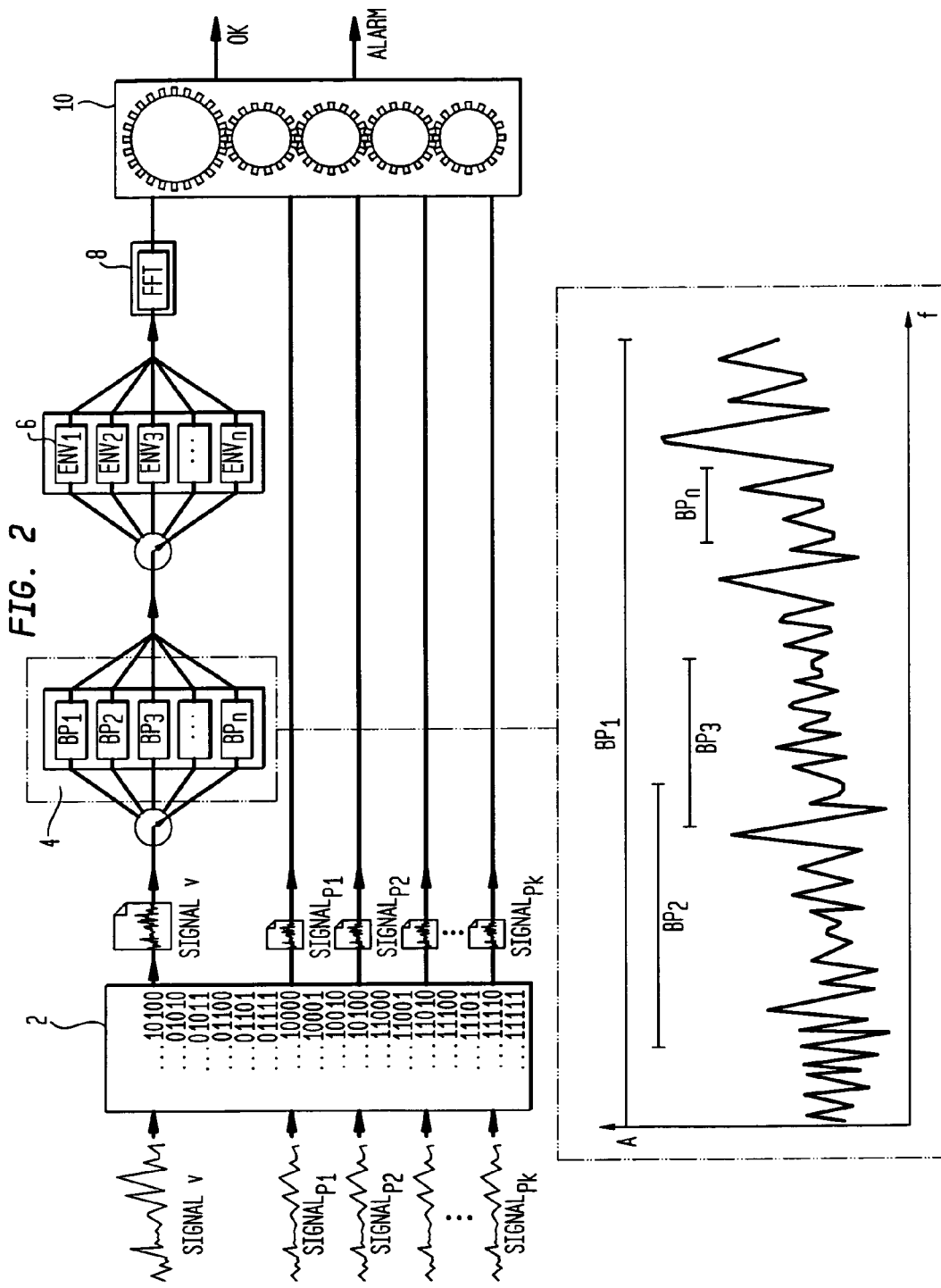
FIG. 2 illustrates the definition of the network of filters of the embodiment shown in FIG. 1.

FIG. 2 illustrates schematically an example of the pass bands $BP_1, BP_2, BP_3 \ldots BP_n$ of the bandpass filters of the filter network, and the frequency contents of a typical vibration signal v supplied to the bandpass filters.

As mentioned above digital raw (unfiltered) signal is utilized several times by using a network of digital filters 4, 6. Such a network of filters, which is needed for the multi-function approach, includes in addition to filters. demodulators, frequency transformers etc., which are predetermined in a DSP-control. Each measurement point and even each monitoring parameter, viz. vibration signal with a specific running condition p or process parameter p, have its own identity and configuration. Therefore data for machine status and running conditions are related to the vibration or acceleration signal, see FIG. 2.

Figure 3:
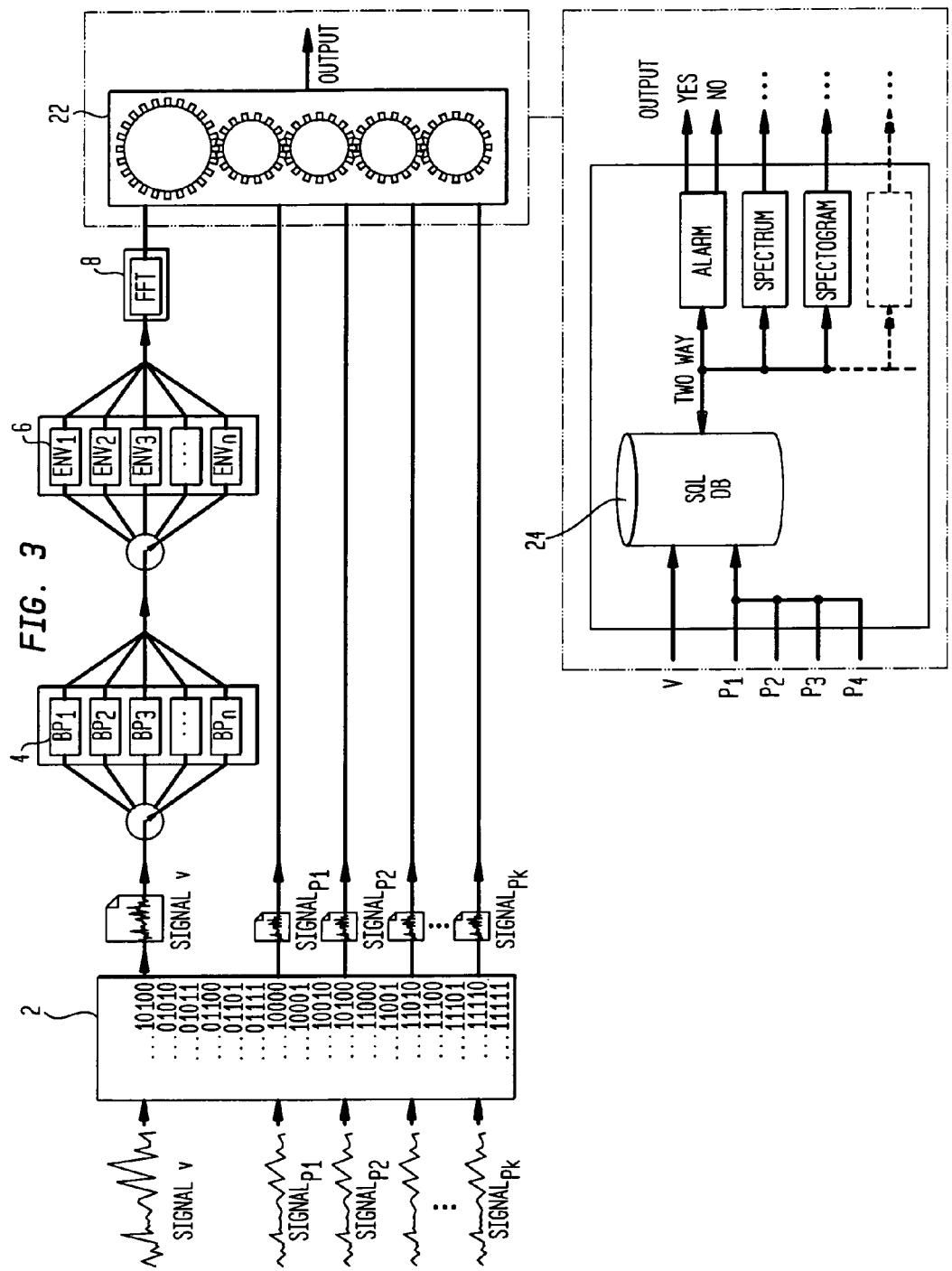
FIG. 3 illustrates criteria based signal processing in the system according to the invention.

FIG. 3 shows an embodiment of the system according to the invention where the function unit 10 in FIGS. 1 and 2 is further developed to a general criteria based signal processing means 22. This signal processing means 22 includes an SQL-database 24 in which simultaneously measured, viz. simultaneously sampled, vibration signal data and machine operating condition data and/or parameter data of the process run on the machine are stored.

From the database 24 all measurements taken at predefined loading conditions can be pre-selected and the results of the analysis grouped together. Thus data from the SQL-database 24 are selected according to certain criteria and processed by different data processing tools. A SQL-database search is consequently imposed before the signal or data processing tools are used. Thus, e.g. vibration signals v collected during operating conditions when the main machine power is in the range of 0-1 MW can be selected for visualization in a spectrogram. Only data fulfilling this criterion are consequently selected and the signal or data processing results in a spectrogram consisting of data according to this specific selection. By monitoring this spectrogram any significant change in the vibration signal during this specific operating condition is then easily observed or detected. Parameters used in connection with frequency analysis could be e.g. vibration level in a frequency band around 1 kHz, vibration level in a frequency band around 2 kHz, frequency peaks, etc.

Different signal processing tools are available in the criteria based signal processing means 22, like correlation analysis of vibration signal data and operating condition and/or process parameter data with the aid of e.g. Multi Variate Data Analysis or trend analysis. Multi Variate Data Analysis is a statistical tool for pure correlation analysis. In this case the criteria based signal processing means 22 is forming a function unit in analogy with the embodiment in FIGS. 1 and 2.

Outputs extracted by the criteria based signal processing means 22 are e.g. alarm yes/no, frequency spectra and spectrograms. Alarm threshold levels are set after a learning period for the signal processing configuration of the system and the monitored object, as mentioned above.

Thus the invention provides a powerful automatic monitoring system. As a result of the filtering by the network of filters 4, 6 the "best" data are stored in the SQL-database 24 for the subsequent further signal processing in the signal processing means 22. By the criteria based data processing data are processed in the most efficient and convenient way by relating the vibration signal data to operating condition and/or process parameter data.

Figure 4:
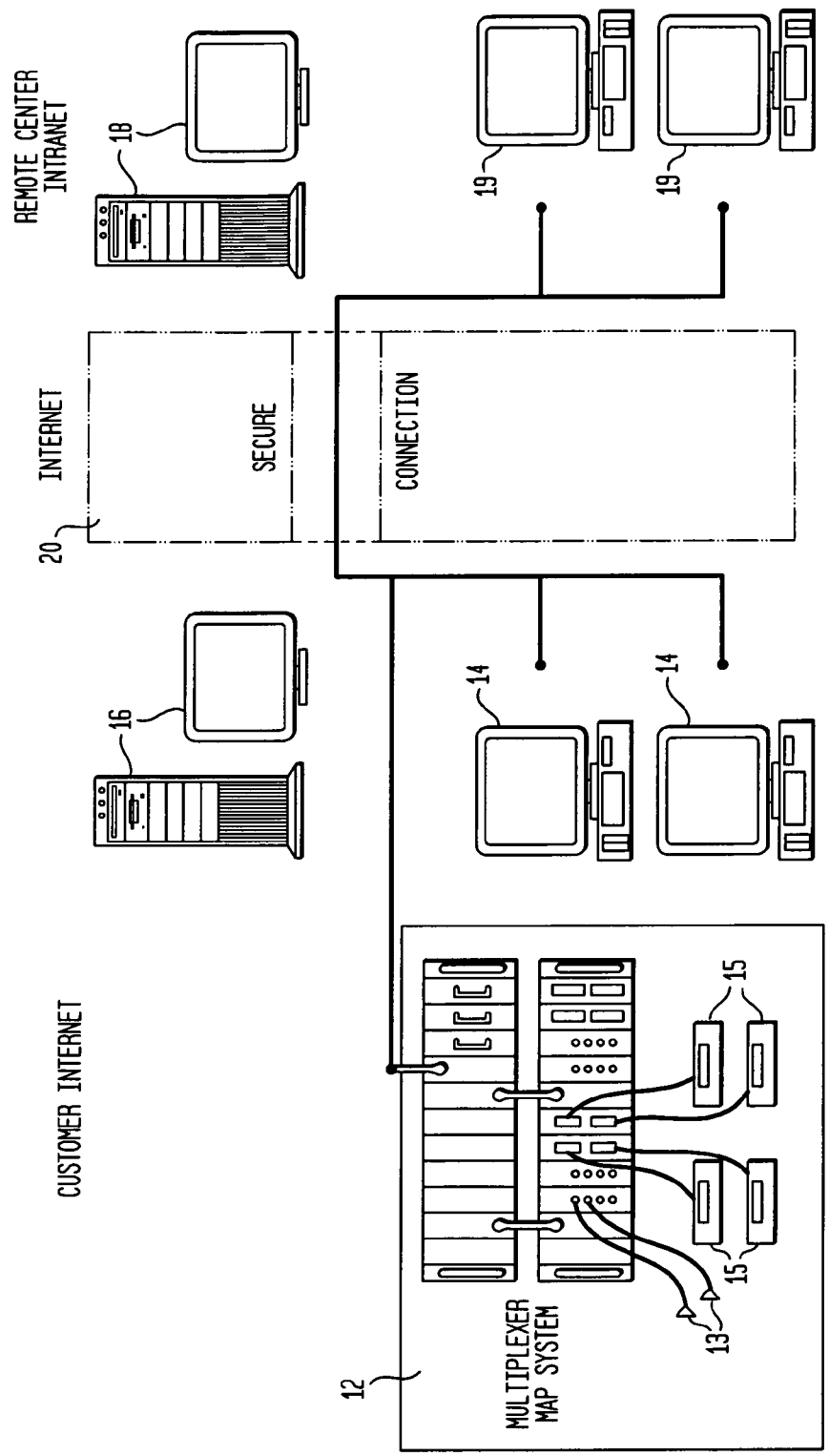
FIG. 4 illustrates an embodiment for remote operation of the monitoring system according to the invention.

FIG. 4 illustrates the layout of a system for access to and communication with a remotely located monitoring site. The system includes a PC-based data acquisition unit 12 including eight ICP channels and eight channels of AC or 4-20 mA for acquiring up to eight vibration signals, sensed by ICP sensors 13, together with supplied process parameters, at 15 in FIG. 4, similar to the corresponding unit shown in FIG. 1.

The data acquisition unit 12 can be reached from customer PCs 14 via a customer's intranet. The data acquisition unit 12 can also be accessed via Internet from a remote service centre 19 with the aid of suitable communication equipments 16, 18 at the customer side and the service centre side, respectively. The Internet connection is provided with suitable security means, schematically illustrated at 20 in FIG. 4. Thus data can be analyzed at the remote service centre, where troubleshooting and reporting is prepared and sent to the customer.

The system is consequently in a way designed to run as server. It is entirely controlled by its own local database and the user communicates with it via Internet or a intranet. All operations including set-up, data acquisition, post-processing, trending and reporting are automatically performed on a time scale basis.

Users are accessing both database and reports via Internet or by remote connection. Different access privileges can be given to different users. System software is located on only one PC, which thus is running as server, and therefore all up-gradings, configurations etc. can be performed on one PC. Other users can get the information via Internet.

Figure 5:
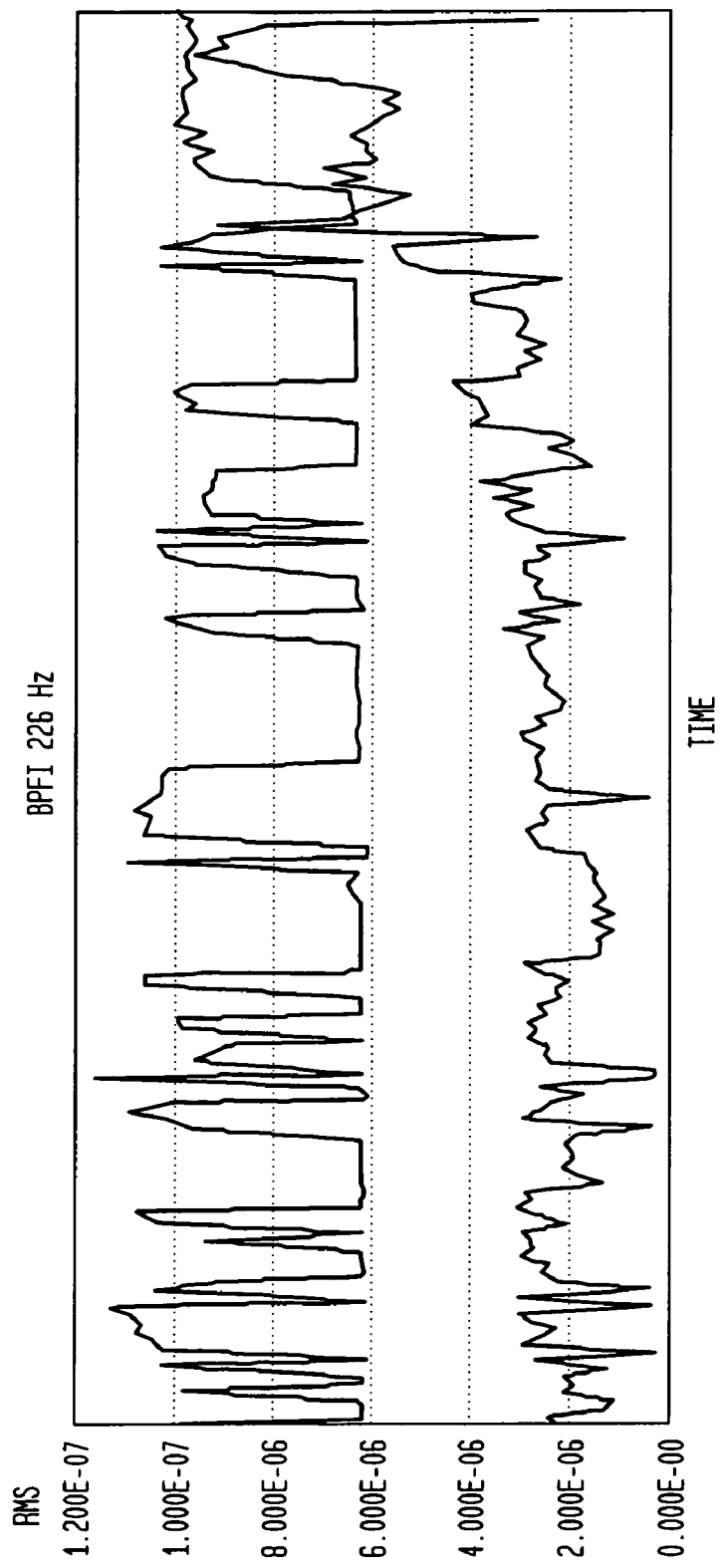
FIG. 5 shows an example of a measured vibration signature and the main motor power for driving a refiner.

FIG. 5 shows qualitatively the root means square (RMS) of the vibration signature measured in a bearing of a refiner and the power of a main motor for driving a refiner during a period of one month.

Figure 6:
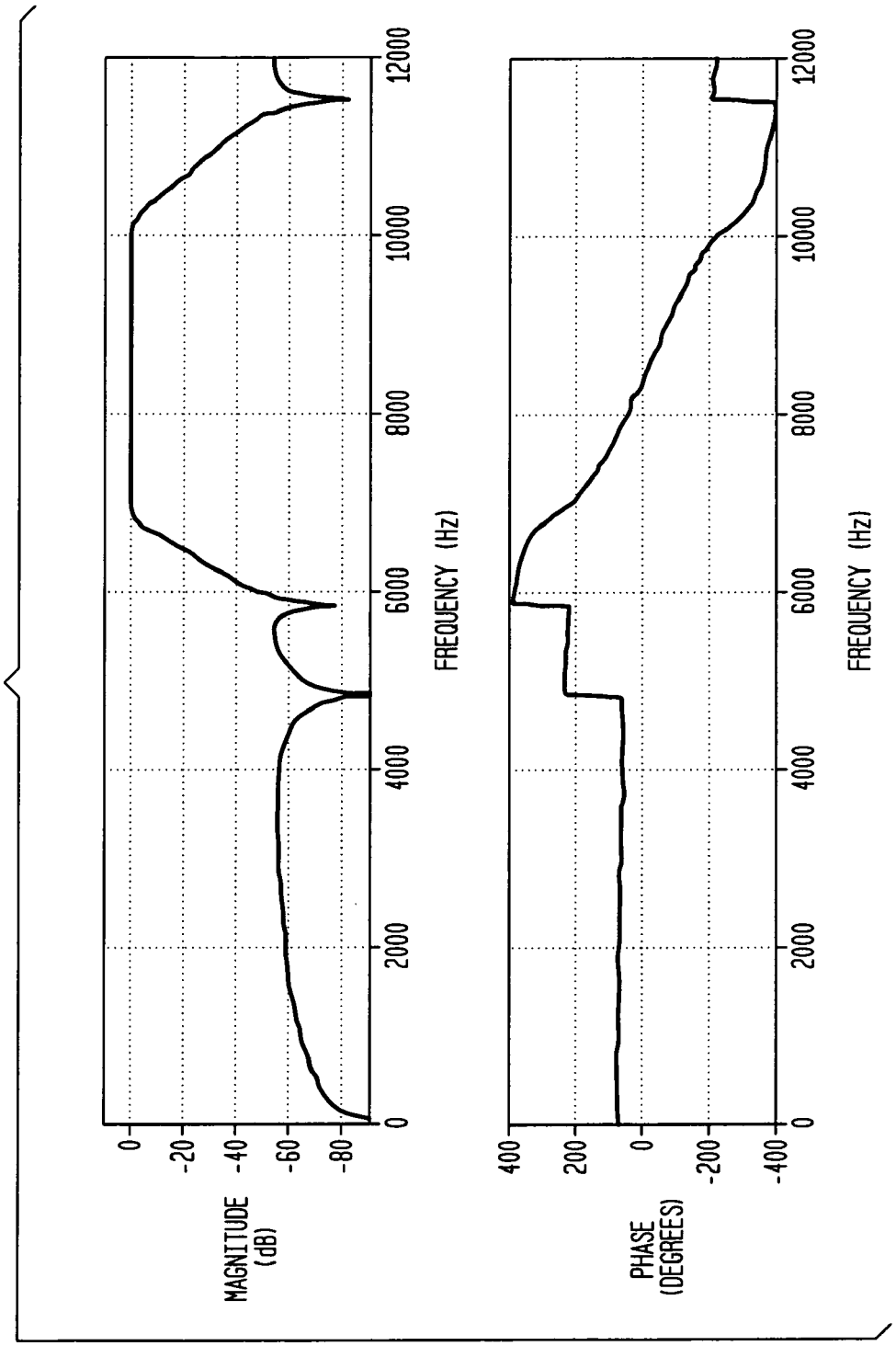
FIG. 6 shows an example of characteristics of a bandpass filter used in the system according to the invention.

FIG. 6 shows an example of typical characteristics of a bandpass filter with a passband of 7-10 kHz, suitable for use in the network of filters of the system according to the invention.

Figure 7:
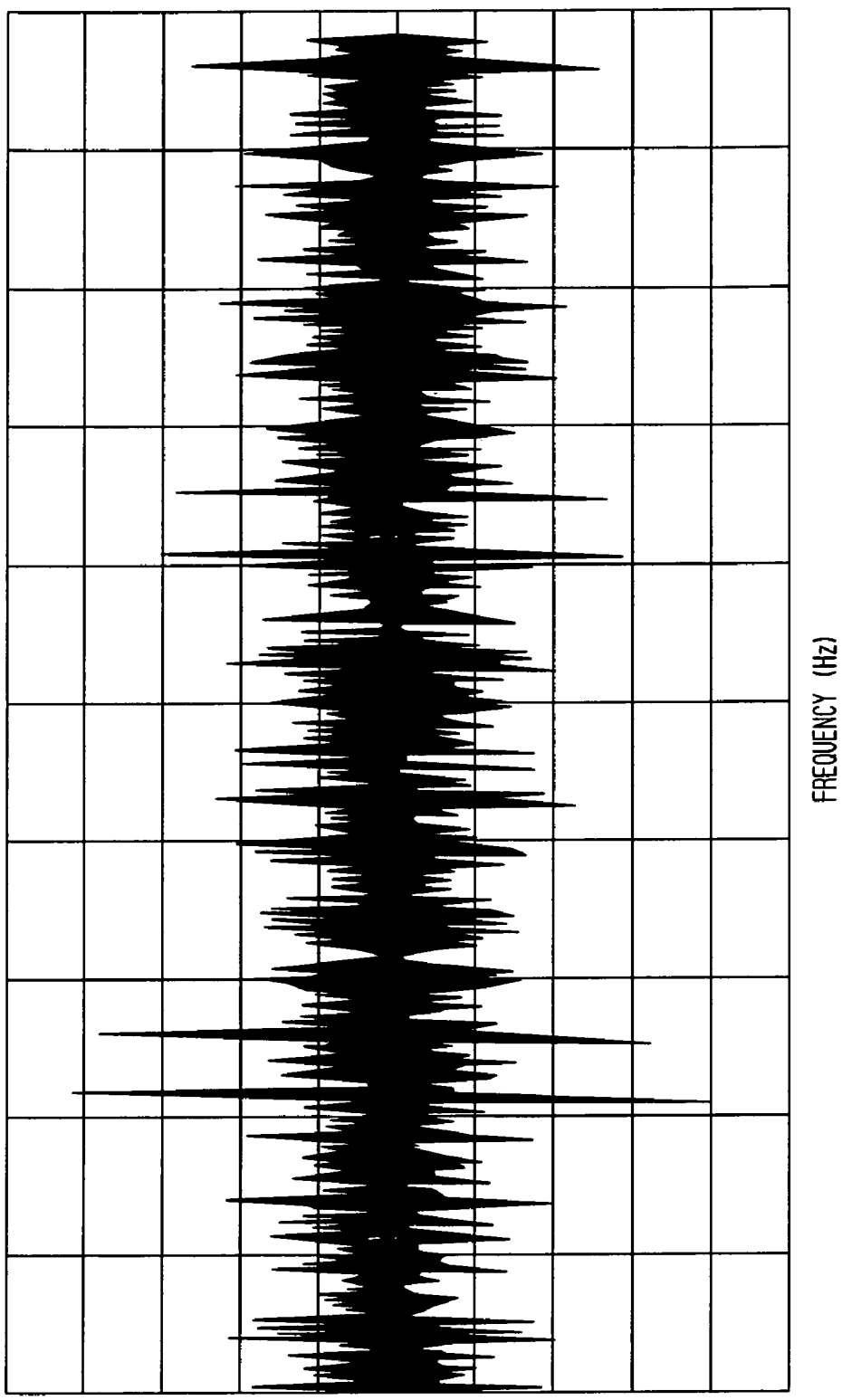
FIGS. 7 and 8 show an example of the vibration signal in the time domain and in the frequency domain respectively.
Figure 8:
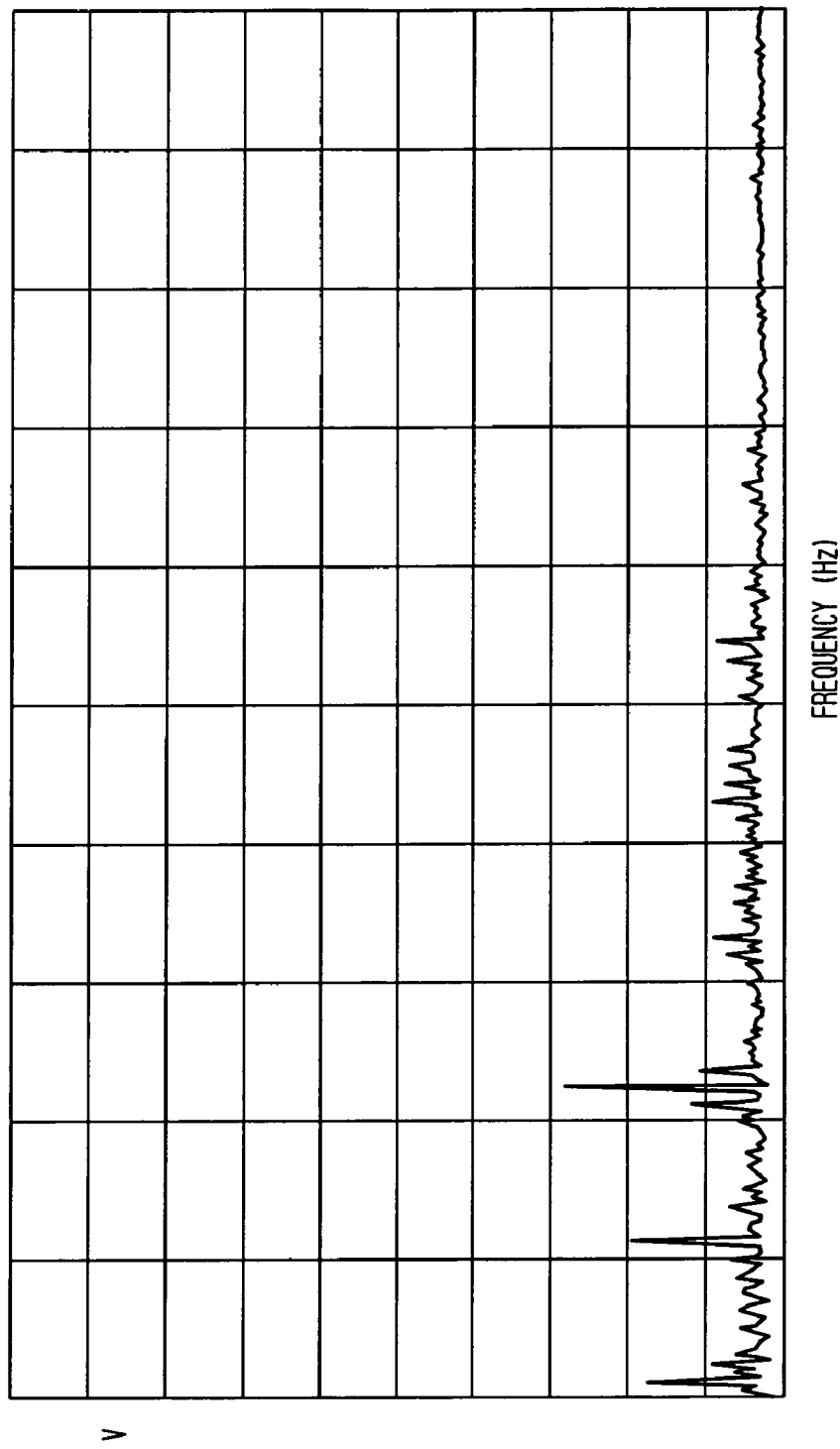

FIGS. 7 and 8 show in the time domain and in the frequency domain, respectively, the average of five measured signals filtered by a band pass filter according to FIG. 6. The sampling frequency equals to 50 kHz.

Figure 9:
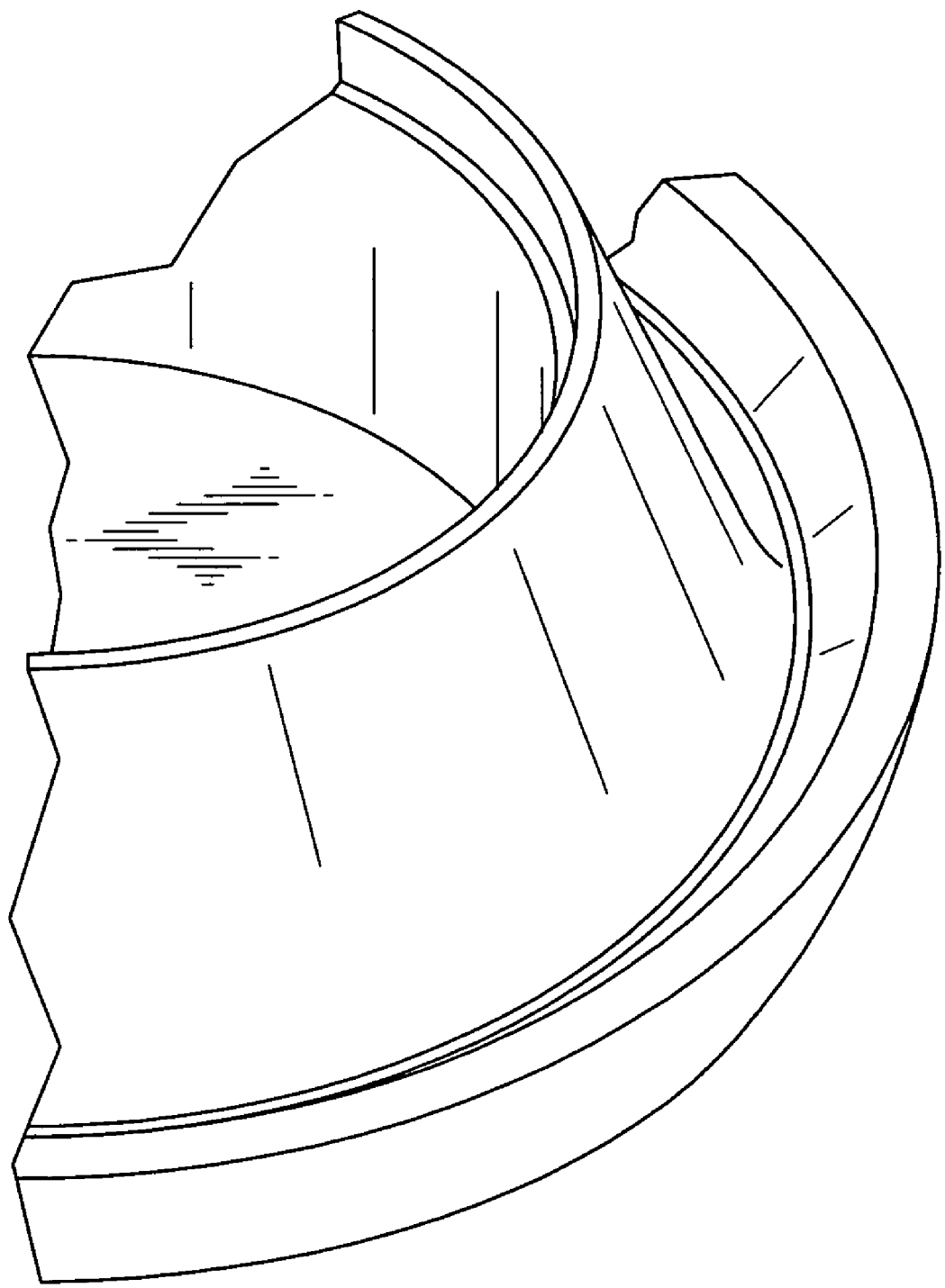
FIG. 9 shows an example of a bearing defect detected by the invention.

FIG. 9 shows a defect on an inner race of a refiner bearing, which defect was detected by a system according to the invention four weeks before the shut down.

As mentioned above, with the present invention it is possible to build up networks of digital filters tailor made for each refiner and each measurement point. Thus, by its open architecture the system according to the invention becomes flexible and tailor made monitoring solutions can easily be presented to each customer.

With the present invention it is also possible not only to avoid emergency stops in the production but also to optimize the relationship between machine condition and the process. By utilizing the technology according to the present invention it is possible to find the fundamental sources for problems in a machine. Longer lifetimes of moving machine parts can be obtained and parameters for processes run on the machine can be optimized.

Above examples of the system according to the invention have been described mainly relating to the monitoring of bearings in rotating machines. The system according to the invention offers, however, a total monitoring concept as described above. It can be scaled down or extended according to the monitoring needs. Thus other possible applications are monitoring of gear boxes and moving pistons and also pure process monitoring. Portable monitoring systems can be made too. Also in the examples described above vibration or acceleration signals are used for the analysis. However, other types of signals, like e.g. ultrasonic signals, can be used as well and analyzed in an analogous way, as well.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of monitoring the status of a rotating machine and/or of a process run on the machine, the method comprising:

measuring and storing a plurality of parameters containing information about the status of the machine and/or process, wherein said plurality of measured parameters contains information about the mechanical condition of a moving part of the machine, and wherein said moving part is a bearing of the machine and said plurality of measured parameters include vibrations in said bearing;

sensing said vibrations and producing corresponding vibration signal data;

determining a loading of the machine by measuring at least one signal representing an operating condition of the machine and/or a parameter of a process run on the machine;

measuring said at least one signal simultaneously with said vibration signal data;

storing said at least one measured signal together with said vibration signal data;

selecting for further processing for monitoring purposes said vibration signal data related to said measured operating condition and/or process parameter according to a first predetermined criterion;

extracting from a database a corresponding plurality of stored reference values for said measured parameters according to a second predetermined criterion; and comparing said plurality of measured parameters with said corresponding plurality of stored reference values for determining the status of the machine and/or the process.

2. The method according to claim 1, wherein said measurements are performed in predetermined regularly spaced time periods.

3. The method according to claim 1, wherein said measurements are performed in predetermined regularly spaced time periods.

4. The method according to claim 1, wherein said measured parameters are treated by statistical methods to verify the stability of the measured parameters before the comparison with corresponding reference values.

5. The method according to claim 4, wherein said plurality of reference values are formed by originally measured pluralities of parameters, and wherein measured pluralities of parameters are grouped according to loading conditions of the machine and cross-correlated with correspondingly grouped originally measured pluralities of parameters.

6. The method according to claim 1, wherein said measured parameters are treated by statistical methods to verify the stability of the measured parameters before the comparison with corresponding reference values.

7. The method according to claim 1, wherein said plurality of reference values are formed by originally measured pluralities of parameters, and wherein measured pluralities of parameters are grouped according to loading conditions of the machine and cross-correlated with correspondingly grouped originally measured pluralities of parameters.

8. The method according to claim 1, and further comprising: correlating through said further signal processing the vibration signal data to the simultaneously measured operating condition and/or process parameter data; and setting an alarm triggering threshold level for the vibration signal depending on the result of the correlation.

9. The method according to claim 8, wherein said correlation is performed by Multi Variate Data Analysis.

10. The method according to claim 8, and further comprising: A/D-converting and processing said vibration signal data in a network of filters; and then storing the converted and processed vibration signal data together with said signal representing an operating condition of the machine and/or a parameter of the process run on the machine.

11. The method according to claim 10, and further comprising determining a frequency pattern for said bearing by the processing of said sensed vibration signal.

12. The method according to claim 8, and further comprising producing and storing for said further processing a plurality of vibration signals representing vibrations in several measuring points of a bearing, or vibrations in several bearings, together with said signal representing an operating condition of the machine and/or a parameter of the process run on the machine.

13. The method according to claim 12, wherein each vibration sensing point is allotted its own address.

14. The method according to claim 8, and further comprising storing a plurality of vibration signals together with a plurality of signals representing several operating conditions of the machine and/or several parameters of the process run on the machine.

15. The method according to claim 8, and further comprising comparing said vibration signal to different safety threshold levels to issue an indication of a safety risk.

16. The method according to claim 1, and further comprising: A/D-converting and processing said vibration signal data in a network of filters; and then storing the converted and processed vibration signal data together with said signal representing an operating condition of the machine and/or a parameter of the process run on the machine.

17. The method according to claim 16, and further comprising determining a frequency pattern for said bearing by the processing of said sensed vibration signal.

18. The method according to claim 16, and further comprising producing and storing for said further processing a plurality of vibration signals representing vibrations in several measuring points of a bearing, or vibrations in several bearings, together with said signal representing an operating condition of the machine and/or a parameter of the process run on the machine.

19. The method according to claim 16, and further comprising storing a plurality of vibration signals together with a plurality of signals representing several operating conditions of the machine and/or several parameters of the process run on the machine.

20. The method according to claim 16, and further comprising comparing said vibration signal to different safety threshold levels to issue an indication of a safety risk.

21. The method according to claim 1, and further comprising producing and storing for said further processing a plurality of vibration signals representing vibrations in several measuring points of a bearing, or vibrations in several bearings, together with said signal representing an operating condition of the machine and/or a parameter of the process run on the machine.

22. The method according to claim 21, wherein each vibration sensing point is allotted its own address.

23. The method according to claim 21, and further comprising comparing said vibration signal to different safety threshold levels to issue an indication of a safety risk.

24. The method according to claim 1, and further comprising storing a plurality of vibration signals together with a plurality of signals representing several operating conditions of the machine and/or several parameters of the process run on the machine.

25. The method according to claim 24, and further comprising comparing said vibration signal to different safety threshold levels to issue an indication of a safety risk.

26. The method according to claim 1, and further comprising comparing said vibration signal to different set warning and/or safety threshold levels to issue a warning and/or an indication of a safety risk.

27. A system for automatic on-line monitoring of the status of a machine and/or a process run on the machine, the system comprising:

at least one sensor for measuring a plurality of parameters containing information about the status of the machine and/or the process run on the machine, wherein said sensor is configured to sense a plurality of parameters containing information about a mechanical condition of at least one moving part of the machine, wherein said machine has at least a rotating component and said at least one moving part is a bearing of said rotating component of said machine, and wherein said at least one sensor is mounted for sensing vibrations in said bearing and producing a corresponding vibration signal;

measuring means for determining a loading of said machine by measuring at least one signal representing an operating condition of said machine and/or a parameter of a process run on said machine simultaneously with the sensing of said vibration signal;

data storing means for storing said vibration signal data together with said simultaneously measured operating condition and/or parameter data;

selecting means for selecting stored vibration signal data depending on values of stored simultaneously measured operating condition and/or process parameter data;

further signal processing means for further signal processing of said selected vibration signal data for monitoring purposes;

a database having a plurality of stored reference values for said measured parameters;

means for extracting from said database the corresponding reference values according to a predetermined criterion;

and a comparator for comparing said plurality of measured parameters with said plurality of corresponding reference values for determining the status of the machine and/or the process.

28. The system according to claim 27, and further comprising: a measuring device for measuring at least one quantity representing the loading of the machine simultaneously with the measurement of said plurality of parameters; and wherein said stored reference values are determined for the same loading of the machine as the loading represented by said measured quantity.

29. The system according to claim 28, wherein said at least one sensor and said measuring device are controlled to perform measurements in predetermined regularly spaced time periods.

30. The system according to claim 28, and further comprising calculation means to treat said measured parameters by statistical methods to verify the stability of said measured parameters before the comparison with corresponding reference: values.

31. The system according to claim 28, and further comprising a trend analyzer for analyzing the result of the comparison of the plurality of measured parameters with the plurality of corresponding reference values to detect incipient faults in said at least one moving part and to monitor the progression of these faults.

32. The system according to claim 28, and further comprising a DSP-controlled network of digital filters for extraction from said database of said plurality of stored reference values according to said second predetermined criterion.

33. The system according to claim 27, and further comprising calculation means to treat said measured parameters by statistical methods to verify the stability of said measured parameters before the comparison with corresponding reference values.

34. The system according to claim 33, and further comprising a trend analyzer for analyzing the result of the comparison of the plurality of measured parameters with the plurality of corresponding reference values to detect incipient faults in said at least one moving part and to monitor the progression of these faults.

35. The system according to claim 27, and further comprising a trend analyzer for analyzing the result of the comparison of the plurality of measured parameters with the plurality of corresponding reference values to detect incipient faults in said at least one moving part and to monitor the progression of these faults.

36. The system according to claim 27, and further comprising a DSP-controlled network of digital filters for extraction from said database of said plurality of stored reference values according to said second predetermined criterion.

37. The system according to claim 36, wherein said network of filters comprises IIR-filters.

38. The system according to claim 36, wherein said network of filters comprises bandpass and envelope filters.

39. The system according to claim 27, wherein said at least one sensor comprises an accelerometer.

40. The system according to claim 27, and further comprising a data acquisition unit, including an A/D-converter and a network of digital filters, connected to said at least one sensor for A/D-converting said sensed vibration signal and extracting information from it.

41. The system according to claim 40, wherein said data acquisition unit is configured to simultaneously collect said vibration signal and said signal representing the status of the machine and/or a parameter of the process run on the machine.

42. The system according to claim 41, wherein said further signal processing means comprises a function unit for correlating said selected vibration signal data with said at least one simultaneously measured signal for setting an alarm triggering threshold level for the vibration signal depending on the result of the correlation.

43. The system according to claim 27, wherein said further signal processing means comprises a function unit for correlating said selected vibration signal data with said at least one simultaneously measured signal for setting an alarm triggering threshold level for the vibration signal depending on the result of the correlation.

44. The system according to claim 43, and further comprising comparator means for comparing the vibration signal with said alarm triggering threshold level.

45. The system according to claim 44, wherein said comparator means is configured to compare said vibration signal to different safety threshold levels, said levels being set depending on the result of said further signal processing, to trigger a safety risk indicator.

46. The system according to claim 43, wherein said at least one sensor comprises a plurality of sensors mounted for sensing vibrations at several measuring points of a bearing or in several bearings, and said further signal processing means comprises a plurality of signal channels for processing said vibration signals from said plurality of sensors.

47. The system according to claim 46, wherein said function unit is configured to correlate said plurality of vibration signals with a plurality of signals representing several operating conditions of the machine and/or several parameters of the process run on the machine.

48. The system according to claim 45, wherein said at least one sensor comprises a plurality of sensors mounted for sensing vibrations at several measuring points of a bearing or in several bearings, and said further signal processing means comprises a plurality of signal channels for processing said vibration signals from said plurality of sensors.

49. The system according to claim 48, wherein said function unit is configured to correlate said plurality of vibration signals with a plurality of signals representing several operating conditions of the machine and/or several parameters of the process run on the machine.

50. The system according to claim 43, wherein said function unit is configured to correlate said plurality of vibration signals with a plurality of signals representing several operating conditions of the machine and/or several parameters of the process run on the machine.

51. The system according to claim 27, wherein said further processing means comprises an FFT-analyzer.

52. The system according to claim 27, wherein said further signal processing means comprises an envelope detector.

53. The system according to claim 27, wherein said further signal processing means comprises an envelope enhancer.

54. The system according to claim 27, wherein said further signal processing means comprises a stroboscopic analyzer.

55. The system according to claim 27, wherein said further signal processing means comprises RMS and peak detectors.

56. The system according to claim 27, wherein said further signal processing means comprises a signal power evaluator.

57. The system according to claim 27, wherein said further signal processing means are realized by function modules.

58. The system according to claim 27, wherein said at least one sensor comprises a plurality of sensors mounted for sensing vibrations at several measuring points of a bearing or in several bearings, and said further signal processing means comprises a plurality of signal channels for processing said vibration signals from said plurality of sensors.

59. The system according to claim 27, and further comprising a client interface for obtaining information from the monitoring via remote means.

60. The system according to claim 59, said client interface comprises means for remote operation of the system.

* * * * *

UNITED STATES PATENT AND TRADEMARK OFFICE
CERTIFICATE OF CORRECTION

PATENT NO. : 7,444,265 B2
APPLICATION NO. : 10/558967
DATED : October 28, 2008
INVENTOR(S) : Tuija Havela et al.

It is certified that error appears in the above-identified patent and that said Letters Patent is hereby corrected as shown below:

Title Page;
On the face of the patent, in the Abstract Section (57):

Line 13, after (22) "are" should read --is--.
Line 18, after "status of" insert --the--.

Column 1, line 28 before "WO 9613011" insert --In--.
Column 1, line 43 "With the present invention a total" should read --The present invention provides a total--.
Column 2, line 4 after "can" delete "thus".
Column 2, line 40 "was" should read --is--.
Column 2, line 43 after "according to" delete "is".
Column 3, line 53 "custom tailored" should read --custom-tailored--.
Column 3, line 59 "than" should read --then--.
Column 4, line 39 "and for instance" should read --and, for instance,--.
Column 5, line 38 "criteria based" should read --criteria-based--.
Column 6, line 37 "is" should read --are--.
Column 6, line 42 before "and" delete "(".
Column 6, line 49 after "above" insert --a--.
Column 6, line 52 "filters." should read --filters,--.
Column 7, line 25 "is forming" should read --forms--.
Column 7, line 55 "is" should read --are--.
Column 8, line 20 "tailor made" should read --tailor-made--.
Column 8, line 58 "contains" should read --contain--.
Column 14, line 12 after "59," insert --wherein--.

Signed and Sealed this

Thirteenth Day of October, 2009

David J. Kappos
*Director of the United States Patent and Trademark Office*